United States Patent

Wolfe

[11] 4,027,756
[45] June 7, 1977

[54] TRANSMISSION WITH SHIFT BLOCKER CLUTCH MECHANISMS

[75] Inventor: Robert W. Wolfe, Jackson, Mich.

[73] Assignee: Clark Equipment Company, Buchanan, Mich.

[22] Filed: Mar. 15, 1976

[21] Appl. No.: 666,531

[52] U.S. Cl. .............................. 192/53 E; 192/53 F
[51] Int. Cl.² ......................................... F16D 23/06
[58] Field of Search ......................... 192/53 E, 53 F

[56] References Cited

UNITED STATES PATENTS

| 3,523,598 | 8/1970 | Thom et al. | 192/53 F |
| 3,692,163 | 9/1972 | Ruettinger | 192/53 F |
| R22,265 | 2/1943 | White | 192/53 F |

*Primary Examiner*—Allan D. Herrmann
*Attorney, Agent, or Firm*—Ernst H. Ruf

[57] ABSTRACT

A rotatable, axially movable first clutch member, having first clutch teeth, is adapted to meshingly engage with a second rotatable clutch member, having second clutch teeth, and blocker means coact with the clutch members for positively preventing engagement of the clutch teeth so long as a substantial difference in relative rotational speed exists therebetween, the blocker means including an annular blocker ring having a plurality of axially projecting struts, with the struts having blocking portions thereon, and some of the first clutch teeth are provided with spaces therebetween capable of receiving therethrough the axially projecting struts, and their blocking portions, when the struts and spaces are axially aligned to permit the blocking portions to move axially into the spaces so that the clutch teeth can be engaged. Torque transmitting means transmit torque between the second clutch member and the blocker means for initially circumferentially offsetting the blocker means relative to the first clutch member when the clutch members are disengaged, with this strut blocking portions engaging with an annular side surface of the first clutch member in the disengaged position while frictionally cooperating surfaces on the blocker means and the second clutch member provide a rotational force to the blocker means both before and when the first clutch portion is shifted toward the second clutch member.

18 Claims, 5 Drawing Figures

TRANSMISSION WITH SHIFT BLOCKER CLUTCH MECHANISMS

BACKGROUND OF THE INVENTION

1. Field of the Invention

The field of art to which this invention pertains includes shiftable change speed gear devices and particularly relates to a transmission, preferably of the constant-mesh gear type, having an interengageable jaw clutch shifting mechanism for substantially simplifying the shifting of the transmission and further having blocker means of simplified construction for improving the operation thereof.

2. Description of the Prior Art

In the design of constant-mesh gear transmissions, specifically heavy duty transmissions for use on trucks or the like, a longstanding problem has been the shifting of these transmissions through their various speed ratios. In most of these transmissions, the shifting process is relatively difficult or the shifting mechanism itself is comparatively complex. Continuing efforts are under way in the design of transmissions to improve not only the shifting method itself, but also to reduce the complexity of the shifting mechanism, to reduce its cost and to increase its reliability.

Nearly all of the previously-noted transmissions utilize synchronizer assemblies, of which many different types are known, with these synchronizer assemblies causing the speed of the jaw or toothed clutch members to be substantially synchronized prior to allowing their engagement during a shifting sequence from one speed ratio to another. While the use of synchronizer assemblies does ease the shifting operation, their use is, in many instances, somewhat undesirable since they not only increase mechanical complexity but also necessarily require additional space and add additional undesired weight and maintenance problems. Therefore, there has been a long existing need for improved heavy duty transmissions that can be readily shifted without the use of conventional synchronizers and yet permit quick, trouble-free shifts.

Examples of prior art shifting structures which operate without the use of conventional synchronizers include U.S. Pat. Nos. 3,799,002; 3,910,131; and 3,921,469. While all the structures shown in these patents appear to be readily workable, they all utilize resiliently yieldable shifting means, the use of which is entirely obviated in the structures of this invention.

SUMMARY OF THE INVENTION

The instant invention sets forth a transmission that utilizes interengageable toothed clutch systems with blocker mechanisms in lieu of the conventional synchronizer assemblies.

The transmission preferably includes a plurality of parallel shafts and a plurality of constant-mesh gears mounted thereon. The clutch mechanism preferably includes an axially slidable jaw clutch portion mounted on one rotatable member and an axially fixed jaw clutch portion mounted on another rotatable member and sized so as to permit intermeshing thereof. The movable clutch portion is axially shiftable between a first unengaged position and a second position wherein the clutch portions are meshingly engaged.

Blocking means coact with the movable clutch portion and the second rotatable member for preventing the movable clutch member from being shifted into the second position so long as a substantial difference exists in the rotational speed between the fixed rotatable clutch portions, with the blocking means including an annular blocking ring having a plurality of axially extending struts, with the struts having blocking portions thereon.

Some of the teeth of the movable clutch portion may be removed to provide spaces capable of slidingly receiving therethrough both struts and the strut blocking portions when the movable clutch portion is shifted into the second position after the rotative speeds of the clutch portions have passed through a synchronous phase. When the movable clutch portion is in its first position, the strut blocking portions are axially removed from the spaces and torque transmitting means, preferably in the shape of a bias ring, is adapted to transmit torque between the second rotatable member and the blocker means for initially circumferentially offsetting the blocking means relative to the movable clutch portion, with the strut blocking positions engaging an annular side surface of the movable clutch portion in its first position.

Frictionally cooperative surfaces on the blocker ring and the second rotatable member help to maintain the circumferential offsetting of the blocker means when the movable clutch portion is relatively shifted from the first toward the second position.

In one embodiment of this invention, the axially shiftable clutch portion and the blocker means rotate with the transmission shaft, with the blocker means coacting with an adjacent rotatable gear. In a further embodiment, the axially movable clutch portion and the blocker means rotate with a gear and the blocker means coacts with an adjacent portion of the transmission shaft. In both embodiments, the axially projecting struts include first-width portions adapted to have a comparatively close fit through the spaces and adjacent second-width portions adapted to freely fit through the spaces so as to permit limited rotational off-setting of the blocking means relative to the axially movable clutch portion. The adjacent ends of the first and second-width strut portions merge into the blocking portions, with the blocking portions causing the force exerted by the axial operating means to be transferred by the blocking means against an adjacent part of the axially fixed clutch portion. Preferably there is a slight included angle between the blocking portions and the adjacent clutch side surface to assure that the blocking means will unblock the movable clutch portion as the rotative speeds of the clutch portions passs through a synchronous phase.

Other features and advantages of this interengageable toothed clutch system will become more readily apparent by persons skilled in the art when following the detailed description in conjunction with the drawings.

DESCRIPTION OF THE PREFERRED EMBODIMENTS

Figure 1:
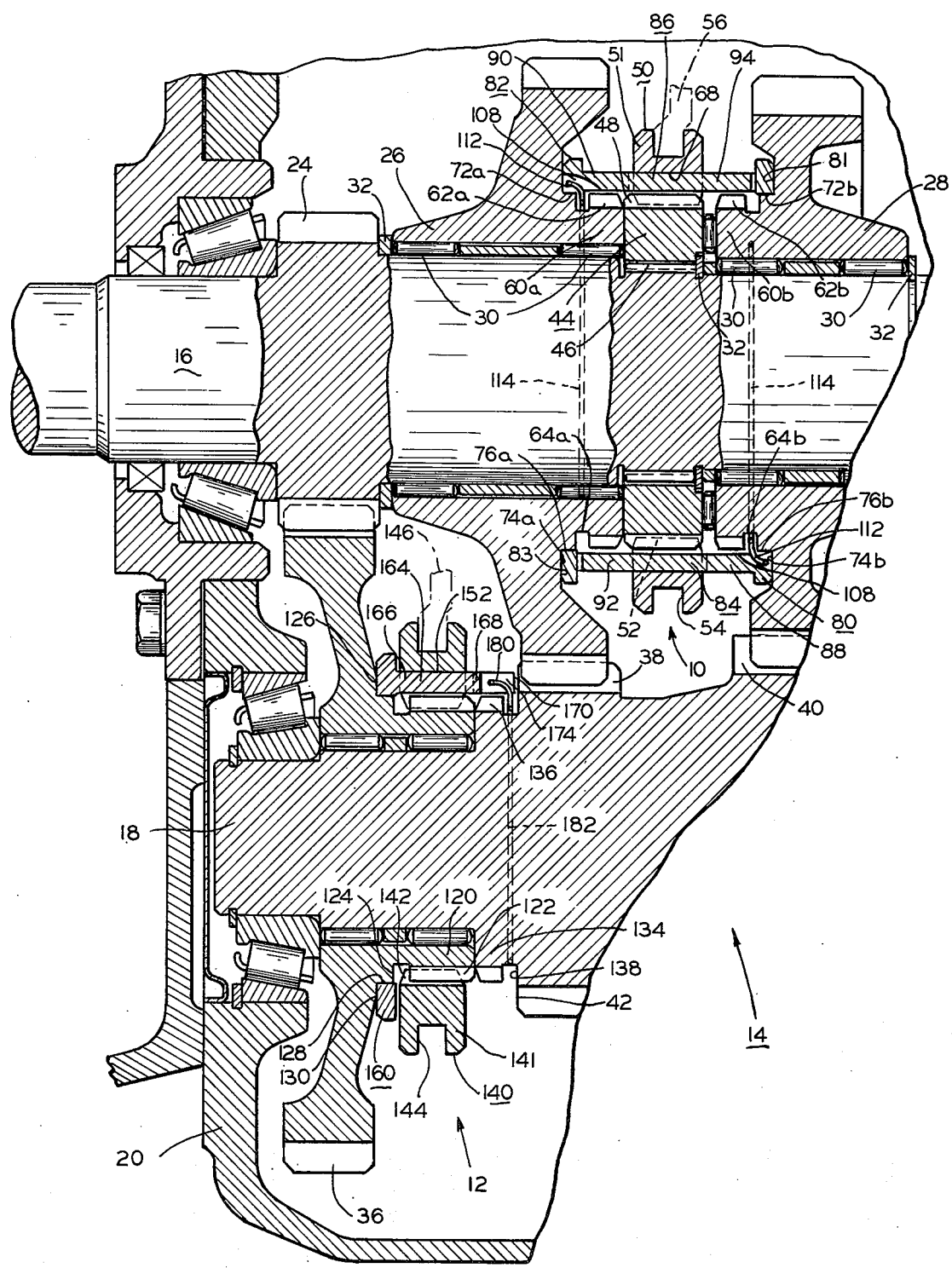
FIG. 1 is an axial sectional view of a portion of a transmission utilizing the shift blocker clutch mechanisms of this invention.

Referring now to the drawings in detail, FIG. 1 shows the shift blocker clutch mechanisms, generally indicated at 10 and 12, which may be used, for example, in a power transmission 14 for selectively clutching a gear to a shaft. As will become clear as the description proceeds, the application of these transmission shift blocker clutch mechanisms to a variety of other selective coupling applications will become apparent to those skilled in the art.

Referring now to FIG. 1 and transmission 14, shafts 16 and 18 are journalled for rotation in a transmission housing 20, with either one of shafts 16 and 18 being the driving or the driven shaft.

Shaft 16, which includes a gear 24 integral therewith or affixed thereto, has further gears 26 and 28 journalled thereon by means of needle or roller bearings 30 and confined against axial movement by retaining washers 32.

Shaft 18 has a gear 36 journalled thereon and confined against axial movement, with gear 36 being in constant mesh with gear 24. In addition, shaft 18 has further gears 38 and 40 integral therewith or affixed thereto, with gears 38 and 40 being in constant mesh with gears 26 and 28, respectively.

Interposed between rotatably journalled gears 26 and 28 is an annular hub member 44 that is affixed to shaft 16 such as by splines 46. Mounted in splined engagement on the peripheral surface of hub member 44 is an axially shiftable collar or sleeve 50 having its internal splines or jaw teeth 52 mating with hub member external splines 48. Annular sleeve 50, which acts as a jaw clutch member 51, also has a reduced annular groove 54 for receiving one end of a shifter yoke, schematically shown at 56, which may be actuated in any desired manner to achieve the axial movement of sleeve 50 relative to hub member 44.

FIG. 1 also shows that gears 26 and 28 are provided with reduced diameter hub portions 60a and 60b respectively. These hub portions, acting as jaw clutch members, are provided with clutch teeth 62a and 62b, respectively, with these clutch teeth being separated from their respective gears by annular grooves 64a, 64b, respectively.

Figure 3:
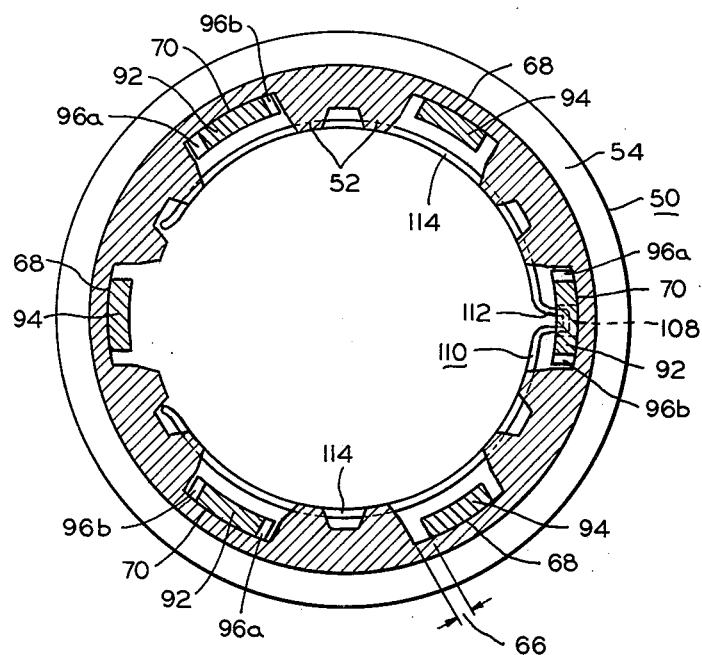
FIG. 3 is a vertical sectional view taken along line 3—3 of FIG. 2

As best seen in FIG. 3, a plurality of equally spaced splines, such as every third internal spline 52, and an adjacent wall portion of sleeve 50, are removed, thereby producing a first set of equally spaced slots 68 and a second alternating set of equally spaced slots 70, with slots 68 and 70 being substantially similar and equally angularly spaced from each other.

Returning now to FIG. 1, it can be seen that gears 26 and 28 are provided with recessed step portions 72a, 72b, respectively, which provide both an axial outer end surface 74a, 74b, as well as a peripheral inner support surface 76a, 76b, for a pair or continuous annular friction or blocker rings 80 and 82 that are received in step portions 72b and 72a, respectively.

Blocker rings 80 and 82 have pluralities of axially projecting portions or struts 84 and 86, respectively, with struts 84 freely passing through sleeve slots 70 whereas struts 86 pass freely through slots 68. Struts 84 and 86 have greater-width inner end portions 88 and 90 adjacent to rings 80 and 82, respectively. The width or angular extent of strut inner end portions 88 and 90 is only slightly less than the width or angular extent of slots 68 and 70 so as to permit passage of the former through the latter.

As best seen in FIGS. 1 and 3, the axial extent of strut end portions 88 and 90 is such that in the neutral position of sleeve 50, i.e., when sleeve 50 is axially equally spaced from rings 80 and 82 or when sleeve 50 is substantially aligned with hub member 44, only the outer or narrow portions 92 and 94 of struts 84 and 86, respectively, axially extend through slots 68 and 70, respectively. The degree of angular movement of each of blocker rings 80 and 82 relative to sleeve 50 is twice the distance (because of bidirectional movement) depicted by numeral 66.

The adjacent ends of strut portions 88 and 92 merge into shoulders or blocking portions 96a, 96b which in turn can abut annular side 98 of sleeve 50. Similarly, strut portions 90 and 94 merge into shoulders 102a, 102b, which in turn can abut annular side 104 of sleeve 50.

Figure 2:
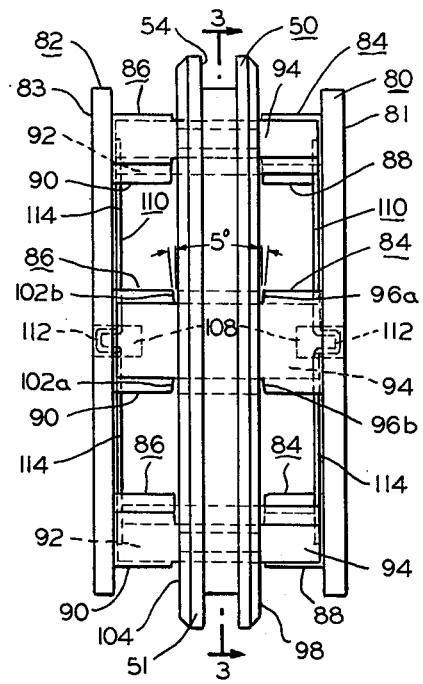
FIG. 2 is a simplified showing of one embodiment of the shift blocker clutch mechanisms of this invention.

As best seen in FIGS. 1 and 2, each of blocker rings 80 and 82 is provided with a slot or recess 108 which serves to retain a laterally bent finger portion 112 of a bias ring or spring ring 110 which is crescent-shaped and has arcuate side arms 114 whose inner ends merge into finger portion 112. As best seen in FIG. 1, bias spring side arms 114 are engagingly or frictionally received in annular grooves 64a, 64b in gears 26 and 28, respectively.

Assuming that shaft 16 is an input shaft, is rotating, and has gear 28 coupled thereto, and also assuming that gear 36 is not coupled to output shaft 18, then shaft 16 is rotating with reference to gear 26 which is also freely rotating at this time, by virtue of being in constant mesh with gear 38 on shaft 18. If it is now desired to couple gear 26 for conjoint rotation with shaft 16, then collar or sleeve 50 must be shifted to the left. Since gear 28 is coupled to shaft 16, sleeve 50 is in the right hand position and must thus be first shifted to its neutral or central position which can be accomplished after the operator releases the vehicle throttle or other such means to eliminate the torque lock. As previously noted, side arms 114 of bias ring 110 are frictionally engaged in annular gear groove 64a, with bias ring 110, by virtue of its attachment to blocker ring 82, assuring that blocker ring 82 is always angularly displaced relative to sleeve 50 in the neutral position. Upon the attempted axial movement of sleeve 50 from the neutral position (with the driving torque still released) there is an abutment of one set of shoulders 102a or 102b with annular side 104 of sleeve 50. The abutment, for example, of shoulders 102a with side 104 causes the axial end force that is exerted on sleeve 50 to be transferred to blocker ring annular end surface 83 which will then abut and rub against adjacent axial end surface 74a of step portion 72a of gear 26. While the use of bias rings 110 is not mandatory, their use does assure that blocker rings 80 and 82 are angularly displaced relative to sleeve 50 for as long as there is a substantial difference in rotational speeds between gears 26, 28 and shaft 16.

As best seen in FIG. 1, in the neutral or central position of sleeve 50, gear 26 is driven by output shaft 18 by virtue of the intermeshing of gears 26 and 38, whereas sleeve 50 of course rotates at input shaft speed. Since the shift from gear 28 to gear 26 involves an upshift (the pitch diameter of gear 26 is greater than that of gear 28), the rotational speed of gear 26 is less than that of input shaft 16, which means that either the rotational speed of gear 26 must be increased to that of shaft 16 or the rotational speed of shaft 16 must be decreased to that of gear 26 in order to achieve the desired synchronization thereof. Since, in this instance, gears 26 and 28 are assumed to be driven by the vehicle, which has a large mass, they will tend to continue at the same speed they had prior to uncoupling of sleeve 50 from gear 28. Shaft 16 is coupled to the engine, which also has a large mass, but slows down (with the throttle closed) because of internal engine friction until there is synchronization between the rotational speeds of gear 26 and shaft 16.

At synchronization, even though there is of course no longer any rotational movement between blocker ring 82 and gear 26, there is still abutment of blocker strut shoulders 102a and sleeve side 104. It is not until the rotational speed of shaft 16 decreases to slightly below synchronization that blocker ring 82, due to the now static contact of its end surface 83 against gear surface 74a (and also the static drag of spring 114 against groove 64a in gear 26), is caused to move toward its other limit of lost motion (toward abutment of shoulder 102b with sleeve side 104) relative to sleeve 50. In so doing, ring 82 will reach an intermediate position, as best seen in FIGS. 2 and 3, wherein strut end portions 86 will be aligned with slots 68 (neither of shoulders 102a, 102b abuts sleeve side 104), with this alignment unblocking sleeve 50 with respect to strut shoulders 102a, 102b. If sleeve internal splines 50 are properly indexed with reference to clutch teeth 62a, so as to permit meshing, then sleeve 50 can be displaced to the left and gear 28 is coupled to shaft 16 for conjoint rotation therewith. If sleeve internal splines 50 fully or partially abut clutch 62a, a further slight decrease in the rotational speed of shaft 16 will cause the proper indexing for the desired meshing and the desired shift will be completed. In fact, all that is necessary in order to shift from one gear ratio to another is for the operator to apply a light pressure on the shift lever, release the vehicle throttle, move the shift lever (not shown) toward the selected position, and continue to exert a steady light pressure thereagainst until the shift is completed. It should be understood that power operated means can replace the operator's hand pressure since no great skill is required. Of course, upon the coupling or engagement of gear 26 to shaft 16, friction or blocker ring 82, gear 26 and sleeve 50 all rotate in unison.

The just-described operational sequence is of course similar for the coupling of gear 28 to shaft 18 by virtue of the movement of sleeve 50 to the right. In downshifting of course the rotational speed of the input shaft must increase in order to achieve synchronization. This is accomplished by immediately opening the throttle following the momentary closing to obtain a torque reversal. It should be understood that in the just-described embodiment, sleeve 50 can be axially shifted in either direction to couple either of gears 26 and 28 to shaft 16. If there were but one gear, then only one of blocker rings 80 or 82 would be utilized, with the operational sequence remaining substantially the same.

Returning now to the FIG. 1 structure, it will be noted that gear 36 is also provided with a reduced diameter hub portion 120 having clutch teeth or spline portions 122, with the latter being separated from the web of gear 36 by an annular groove 124. Gear 36 also has a step portion 126 having an inner peripheral surface 128 and an axial end surface 130. Shaft 18 is provided with an increased diameter portion 134 acting as a jaw clutch member, with portion 134 having clutch teeth 136 and an annular groove 138 between clutch teeth 136 and the adjacent axial end surface 42 of gear 38.

A collar or sleeve member 140, which acts as a jaw clutch member 141, having internal splines or jaw teeth 142, is rotatably affixed to but axially slidably movable on gear hub portion 120. Sleeve 140 is also provided with a peripheral groove 144 which receives one end of a shifter yoke schematically shown at 146.

Figure 5:
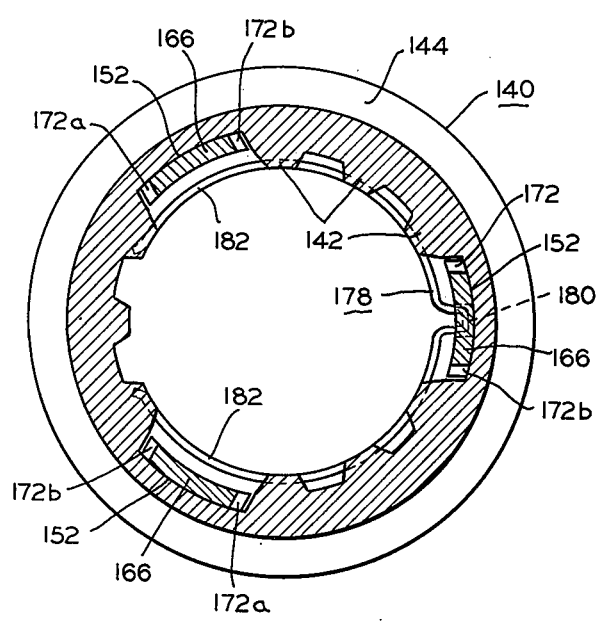
FIG. 5 is a vertical sectional view taken along line 5—5 of FIG. 4.
Figure 4:
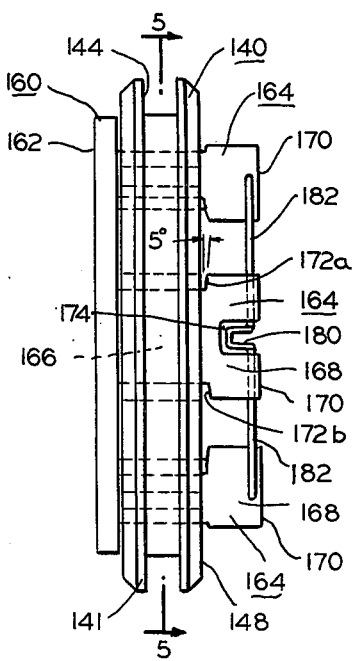
FIG. 4 is another embodiment of the shift blocker clutch mechanisms of this invention.

As best seen in FIG. 5, a plurality of equally spaced splines or teeth, such as every fourth internal collar spline 142, may be removed so as to produce a plurality of axial slots 152. Freely mounted on gear step portion 126 is an annular friction or blocker ring 160 which has a plurality of struts 164 extending through slots 152. Struts 164 include narrow inner portions 166 and wider end portions 168, with the latter having a comparatively close fit relative to slots 152. Strut portions 166 and 168 meet at shoulder portions 172a, 172b. As best seen in FIG. 1, strut portions 168 basically overlie or surround clutch teeth 136. One of strut portions 168 is provided with a slot or recess 174 which serves to retain a laterally bent finger portion 180 of a crescent-shaped friction ring or bias spring 178 also having arcuate side arms 182 frictionally engaged in shaft groove 138.

In shift blocker mechanism 12, sleeve 140 and blocker ring 160 are fixed for rotation with gear 36. Assuming, for example, that it is desired to connect gear 36 for conjoint rotation with shaft 18, then sleeve 140 must be axially shifted to the right for thereby coupling gear clutch teeth 122 to shaft clutch teeth 136. If, however, the gear 36 and shaft 18 are rotating at different speeds, blocker ring 160 will be rotationally or angularly displaced relative to sleeve 140, i.e., blocker ring struts 164 will not be centered relative to sleeve member slots 152 and therefore shoulders 172a or 172b will abut sleeve annular side 148. Friction ring or bias spring 178, by reason of its frictional engagement in shaft groove 138 assures that blocker or friction ring 160 is always angularly displaced relative to sleeve 140 in the neutral position, so that upon the attempted axial movement of sleeve 40, when the rotational speeds of gear 36 and shaft 18 are not the same, there is abutment between strut shoulders 172a or 172b and sleeve side 148.

Assuming that the rotational speeds of gear 36 and shaft 18 are not synchronized, then the axial end force exerted on sleeve 140 is transferred via struts 164 to axial end surfaces 170 of strut portions 168, with end surfaces 170 abutting and rubbing against adjacent axial end surface 42 of gear 38. As previously described, relative to blocker mechanism 10, synchronization in upshifting or downshifting is achieved by a decrease or an increase, respectively, in the rotational speed of the input shaft, and once synchronization is achieved, blocker ring 160 will reach an intermediate position wherein strut portions 164 will be aligned with slots 152, with this alignment unblocking sleeve 140 relative to strut shoulders 172a, 172b. Thereafter the shifting of sleeve 140 into coupling position with shaft clutch teeth 136 can proceed in the manner previously described with reference to blocker mechanism 10, thereby coupling gear 36 to shaft 18 for conjoint rotation therewith.

In order to achieve the smooth functioning of shift blocker mechanism 12, shoulders 172a and 172b actually are slightly angled (5°) relative to sleeve annular side 148 to make certain that surfaces 170 and 42 will not move with respect to each other, but surfaces 172a or 172b, bearing against sleeve side 148, will slide during the desired unblocking operation that occurs just past synchronization. The drag of spring 178 also assists in assuring this action. Shoulders 96a, 96b and 102a, 102b of shift blocker mechanism 10 are similarly angled for the same purpose.

From the foregoing, it is believed that those familiar with the art will readily recognize and appreciate the novel concepts and features of the present invention. Obviously, while the invention has been described in relation to only two preferred embodiments, numerous variations, changes and substitutions of equivalents will present themselves to persons skilled in the art and may be made without necessarily departing from the scope and principles of this invention. As a result, the embodiments described herein are subject to various modifications, changes and the like, without departing from the scope and spirit of the invention. Consequently, the scope of this invention should be determined solely by reference to the claims appended hereto.

What is claimed is:

1. In an interengageable toothed clutch system, the combination comprising:
   a. first rotatable means having a collar member mounted thereon in axial sliding relationship and positive rotation therewith, said collar member having a first clutch portion with first clutch teeth;
   b. second rotatable means, coaxially related to said first rotatable means and axially fixed relative thereto, having a second clutch portion with second clutch teeth arranged thereon for interengagement with said first clutch teeth upon relative movement of said first clutch portion relative to said second clutch portion;
   c. blocker means coacting with said first clutch portion and said second rotatable means for positive preventing engagement of said clutch teeth so long as a substantial difference in relative rotational speed exists between said first and second rotatable means, said blocker means including an annular blocker ring having a plurality of axially projecting struts, with said struts having blocking portions thereon; thereon;
   d. some of said first clutch teeth being provided with spaces therebetween capable of receiving therethrough said axially projecting struts, including said blocking portions, when said struts and said spaces are axially aligned to permit said blocking portions to relatively move axially into said spaces so that said clutch teeth can be engaged with one another; and
   e. a surface on one of said blocker ring and ends of said struts removed from said blocker ring frictionally cooperating with a surface on said second rotatable means for offsetting said blocker means with respect to said first rotatable means whenever and for so long as a substantial difference in relative rotative speeds exists between said respective clutch portions, said blocking portions interfering with an annular side surface of said first clutch portion when said blocker means is circumferentially offset relative to said collar member so as to prevent engagement of said clutch portions.

2. The device of claim 1 further including means operatively interposed between said second rotatable means and said blocker means, attached to the latter and in embracing frictional engagement with the former, adapted to transmit torque therebetween for initially offsetting said blocker means relative to said first clutch portion whereby said struts are axially misaligned with respect to said first clutch teeth spaces for as long as a substantial difference in relative rotational speeds exists between said respective clutch portions.

3. The device of claim 2 wherein said means for transmitting torque is crescent-shaped and has opposed arcuate side arms in constricting, embracing, frictional engagement with an annular groove portion in said second rotatable means.

4. The device of claim 3 wherein said means for transmitting torque is attached to one of said annular blocker ring and an end of one of said struts.

5. The device of claim 1 wherein said axially projecting struts include first-width portions adapted to have a comparatively close sliding fit relative to said spaces and adjacent second-width portions adapted to freely fit through said spaces so as to permit limited rotational offsetting of said blocker means relative to said first clutch portion.

6. The device of claim 5 wherein said first-width strut portions are adjacent to said blocker ring.

7. The device of claim 5 wherein said second-width strut portions are adjacent to said blocker ring.

8. The device of claim 5 wherein the adjacent ends of said first and second-width strut portions merge into said blocking portions, said blocking portions being adapted to abut an adjacent annular side surface of said first clutch portion so as to prevent the sliding and subsequent engagement of said first clutch portion relative to said second clutch portion whenever and for as long as a substantial difference in rotative speeds exists between said respective clutch portions.

9. The device of claim 8 wherein said blocking portions abut the first clutch portion annular side surface that is opposite said blocker ring.

10. The device of claim 8 wherein said blocking portions abut the first clutch portion annular side surface that is remote from said blocker ring.

11. The device of claim 1 wherein there is a slight included angle between said blocking portions and the annular side surface of said first clutch portion so as to assure that said blocker means will unblock said first clutch portion as the rotative speeds of said clutch portions pass through a synchronous phase.

12. The device of claim 11 wherein said included angle is about 5°.

13. An interengageable clutch system comprising:
   a. first jaw clutch means fixed for rotation on a first rotatable means, said first jaw clutch means including an annular peripheral surface and a set of first clutch teeth projecting radially therefrom;
   b. second jaw clutch means coaxially aligned with said first jaw clutch means and fixed for rotation on a second rotatable means, said second jaw clutch means including a set of second clutch teeth projecting radially therefrom, said first and second clutch teeth projecting radially in opposite directions and being sized to meshingly engage with one another;

c. said first jaw clutch means being axially shiftable between a first position wherein said first and second clutch teeth are in a disengaged and axially spaced relation and a second position wherein said first and second clutch teeth are meshingly engaged;

d. blocking means coacting between said first jaw clutch means and said second rotatable means for preventing said first jaw clutch means from being shifted into said second position so long as a substantial difference exists in the rotational speed between said first and second jaw clutch means, said blocking means including an annular blocking ring having a plurality of axially extending struts, with said struts having blocking portions thereon;

e. some of said first clutch teeth and radially adjacent portions of said first jaw clutch means being removed to provide spaces capable of slidingly receiving therethrough both said struts and strut blocking portions when said first jaw clutch means is shifted into said second position after the rotative speeds of said first and second clutch means pass through a synchronous phase, said strut blocking portions being axially removed from said spaces when said first jaw clutch means is located in said first position;

f. means for transmitting torque, operatively interposed between said second rotatable means and said blocker means, attached to one of them and in embracing frictional engagement with the other, is adapted to transmit torque therebetween for initially circumferentially offsetting said blocking means relative to said first jaw clutch means when said first jaw clutch means is in said first position, said strut blocking portions engaging with an annular side surface of said first jaw clutch means in said first position; and g. a surface on one of said blocker ring and ends of said struts, removed from said blocker ring, and a surface on said rotatable means which frictionally cooperate with one another and help to maintain said circumferential offsetting of said blocking means when said first jaw clutch means is relatively shifted from said first to said second position.

14. The device of claim 13 wherein said axially projecting struts include first-width portions adapted to have a comparatively close sliding fit relative to said spaces and adjacent second-width portions adapted to freely fit through said spaces so as to permit limited rotational offsetting of said blocking means relative to said first jaw clutch means.

15. The device of claim 14 wherein the adjacent ends of said first and second-width strut portions merge into said blocking portions, said blocking portions being adapted to abut an adjacent annular side surface of said first jaw clutch means so as to prevent the sliding and subsequent engagement of said first jaw clutch means relative to said second jaw clutch means whenever and for so long as a substantial difference in rotative speeds exists between said respective clutch means.

16. The device of claim 13 wherein there is a slight included angle between said blocking portions and the annular side surface of said first jaw clutch means so as to assure that said blocking means will unblock said first jaw clutch means as the rotative speeds of said first and second jaw clutch means pass through a synchronous phase.

17. The device of claim 16 wherein said included angle is about 5°.

18. The device of claim 13 wherein said means for transmitting torque is crescent-shaped and has opposed arcuate side arms in constricting, embracing frictional engagement with an annular groove portion in said second rotatable means.

* * * * *